United States Patent Office 3,352,689
Patented Nov. 14, 1967

3,352,689
SUGARLESS GUM
Anthony George Bilotti, Queens Village, N.Y., assignor to Warner-Lambert Pharmaceutical Company, Morris Plains, N.J., a corporation of Delaware
No Drawing. Filed Feb. 14, 1966, Ser. No. 527,060
8 Claims. (Cl. 99—135)

The present application for United States Letters Patent is a continuation-in-part application of copending application Ser. No. 336,106, filed Jan. 7, 1964, and now abandoned.

This invention relates to a sugarless confectionary composition and more particularly, to a new and improved sugarless chewing gum composition having improved taste and texture characteristics and to a method for preparing same.

Sugarless confectionary compositions, and in particular chewing gums, have increased in importance over recent years primarily because of efforts by the dental profession to discourage use of sugar-containing confectionaries. Consumption of sugar-containing confectionaries has been discouraged primarily because of reported studies which allege or conclude that such confectionaries constitute a chief cause of dental caries.

Although sugarless chewing gums heretofore produced have met with acclaim by the dental profession, they have not met with great public acceptance because of poor taste and texture characteristics upon consumption. Such sugarless chewing gums have consisted primarily of gum base, synthetic sweeteners, and suitable flavoring ingredients. The synthetic sweeteners employed in sugarless chewing gums have been used to replace corn syrup and sugar customarily employed in conventional sugar-containing chewing gums. Typically, the synthetic sweeteners include sorbitol or mannitol alone although various combinations of these ingredients have been tried with very little commercial acceptability. Although these synthetic sweeteners have the desirable properties of being water soluble while having an acceptable taste or sweetness, they usually fail to impart a desirable texture to chewing gum compositions which have public acceptance.

In attempting to provide a suitable sugarless chewing gum for acceptance by consumers, it was found that corn syrup which constitutes an ingredient of sugar-containing chewing gums has the unique property of binding the sugar to the gum base and thus there results a sugar-containing chewing gum having a desirable texture. From this discovery, it became apparent that a suitable ingredient was necessary to substitute for corn syrup all its properties without contributing "sugar" properties for use in preparing a sugarless chewing gum having the desirable characteristics of acceptable taste and texture requirements.

In attempting to develop a suitable corn syrup substitute for sugarless chewing gums, various agents such as starch derivatives and dextrines were examined as possible substitutes for corn syrup of sugar-containing chewing gums but these agents were all found undesirable since they readily break down in the digestive tract of the human body and form undesirable sugars. Gelatin and various combinations of gelatin were also examined and were found to yield poor chewing gum products both as to taste and as to texture characteristics. Solutions of gum tragacanth, locust bean gum and agar were also examined and found to be unsatisfactory for inclusion as a corn syrup substitute for use in sugarless chewing gum compositions.

Thereupon, it was surprisingly found that by addition of gum acacia solution to chewing gum base during the blending of ingredients contributes greatly to the formation of a sugarless chewing gum having acceptable taste and texture characteristics upon consumption. Gum acacia solution thereby was found to provide a suitable substitute for corn syrup in the formation of a sugarless chewing gum product.

It is an object of this invention, therefore, to provide a sugarless confectionary composition having improved characteristics of taste and texture over comparable sugarless chewing gums heretofore produced for consumption.

It is also an object of this invention to provide a new improved sugarless chewing gum composition and a method for preparing same with prescribed amounts of ingredients whereby the product has acceptable taste and texture characteristics.

It is another object of this invention to provide a sugarless chewing gum composition containing ingredients which are generally approved by the dental profession and which ingredients contribute to the formation of a sugarless chewing gum composition having acceptable taste and texture characteristics.

It is yet another object of this invention to provide a new improved sugarless chewing gum composition prepared with prescribed amounts of ingredients in combination with gum acacia solution.

These and other objects and advantages will be realized from the folowing detailed description.

Generally described, the present invention is directed to a sugarless chewing gum composition formed with a solution of gum acacia containing from about 30% to about 60% by weight of gum acacia and preferably from about 45% to about 50% by weight thereof dissolved or suspended in water. Although true solutions of gum acacia are contemplated for use herein, it is recognized that the indicated percentages of gum acacia may be present in water with part of the gum acacia being undissolved and the system then appearing as an aqueous suspension or slurry of gum acacia particles.

Gum acacia solution or aqueous suspension, as the system may appear, may be prepared by slowly dissolving gum acacia powder in water heated to about boiling at standard conditions. Powdered gum acacia is desirably employed since it may be expeditiously dissolved in water. Other forms such as granular gum acacia or the like may also be employed as desired.

The following formulations generally respresent the combination of ingredients useful for preparing the sugarless chewing gums of the present invention:

| Ingredients | Broad Range Approx. Parts By Weight | Preferred Range Approx. Parts By Weight |
|---|---|---|
| Gum Base | 20-50 | 20-30 |
| Gum Acacia Solution | 3-15 | 5-10 |
| Sorbitol | 20-50 | 30-40 |
| Gum Acacia Powder | 0-10 | 2-4 |
| Mannitol | 20-50 | 20-30 |
| Flavor and Artificial Sweeteners | 0.1-5 | 0.5-2.5 |

In the procedure of the present invention, it is found desirable to add the gum base, gum acacia solution and artificial sweeteners to a preheated kettle wherein the ingredients are blended by mixing blades. Desirably, the temperature of the mixture is maintained below 70° C. although higher temperatures may be tolerated.

After the ingredients are thoroughly blended, sorbitol is added and after an additional period of mixing the batch, the gum acacia powder, when used, along with mannitol are added. Thereafter, the batch is blended to a substantially uniform mixture and flavoring is added as desired. The chewing gum is desirably maintained at a temperature of about 35° C. to about 50° C. during further processing such as rolling, kneading, and the like to the finished form which is then wrapped and prepared for shipment.

A specifically preferred composition of the present invention is one containing about 28 parts by weight of gum base, about 6 parts by weight of gum acacia solution (45%–50%), about 36 parts by weight of sorbitol, about 27 parts by weight of mannitol, about 3 parts by weight of gum acacia powder and about 1 part by weight flavoring oils and artificial sweeteners. The finally prepared composition is found to have a moisture content of about 3%–5% by weight and typically about 3.5%–4.5% by weight, dry basis.

The gum base which is employed in the present composition generally includes natural gums, synthetic resins, waxes, fillers, and softeners. Typical examples of such materials may be found in vol. 30 of the U.S. Federal Register, No. 247, Sec. 121.1059, dated Dec. 23, 1965.

Gum acacia powder which is added to the present composition is one having a particle size such as less than 100 mesh (U.S. Sieve). Larger particles of gum acacia powder may be employed with the product found to have a less desirable granular or sand-like texture.

Flavoring oils which may be used to impart suitable flavor to the gum base includes all natural, essential and synthetic flavoring oils acceptable by the Food and Drug Administration.

Artificial sweeteners preferably added to the composition include non-caloric sweetening agents such as saccharin and the sodium, potassium or calcium salt of cyclohexylsulfamic acid. Combinations of these ingredients may also be usefully employed.

When preparing the chewing gum composition of the present composition, the gum base containing various ingredients such as natural gums, synthetic resins, waxes, fillers and the like is added to a mixing kettle having suitable agitators for blending additives therein. Thereafter, the additional ingredients are added to the gum base under constant agitation conditions.

The following example is included to further illustrate the practice of the present invention.

EXAMPLE

A gum acacia solution is prepared in a steam jacketed kettle, preheated to about 190° F. to about 200° F. To 52 parts by weight of heated water is slowly added 48 parts by weight of gum acacia powder under constant agitation while cooking at slightly less than a temperature of 200° F. and until a homogeneous solution results. Upon completion, the homogeneous solution is strained through a 30-mesh screen to remove any foreign matter which may remain undissolved therein.

Thirty-two parts by weight of chewing gum base is heated in a mixing kettle to a temperature of about 150° F. Thereafter, 8 parts by weight of the gum acacia solution previously prepared is blended with the chewing gum gas along with 3 parts by weight of gum acacia powder to fortify the gum acacia solution, 28 parts by weight of mannitol and 30 parts by weight of sorbitol. About 1 part by weight of equivalent amounts of flavoring and saccharin is added and the mixture is blended to form a homogeneous chewing gum composition. The gum is thereafter removed from the heated mixing kettle and rolled into slabs of a convenient size. The slabs are thereafter cut into sticks which are aged for a brief period such as one day and wrapped for shipment. Upon consumption, the sugarless chewing gum so formed is found to have acceptable taste and texture.

Although the present chewing gum is desirably formed into sticks, any other suitable form may also be employed. In addition to the ingredients employed in formation of a chewing gum base, additional active ingredients such as phosphates, chlorophyllins, vitamins, enzymes, antacids, fluorides, and the like in solid or liquid form may also be included in the present composition. The amount of these ingredients employed in the chewing gum composition is from about 1% to about 15% by weight based on the weight of the chewing gum product. The solid active ingredients are generally employed in the form of solid particles of 100 mesh (U.S. Sieve) or less and preferably of a mesh size of about 270.

Other confection items to which the present invention may find application include bubble gum and candy-coated gum. The use of any of the approved FD & C dyes or lakes may also be employed in the sugarless chewing gum of the present invention to provide suitable coloring therefor.

Having described the present invention, it will be readily understood that the foregoing detailed description is given merely by way of illustration and that many variations may be made therein without departing from the spirit of the present invention which is to be limited solely by the appended claims.

What is claimed is:

1. A sugarless chewing gum composition having improved taste and texture characteristics consisting essentially of an intimate admixture of the following:
 (a) from about 20 to about 50 parts by weight of gum base;
 (b) from about 3 to about 15 parts by weight of gum acacia-in-water, said gum acacia-in-water system containing from about 30% to about 60% by weight gum acacia powder;
 (c) from about 20 to about 50 parts by weight of sorbitol;
 (d) from 0 to about 10 parts by weight gum acacia powder;
 (e) from about 20 to about 50 parts by weight mannitol; and
 (f) about 0.5 to about 5 parts by weight of flavoring and artificial sweeteners.

2. A sugarless chewing gum composition having improved taste and texture characteristics consisting essentially of an intimate admixture of the following:
 (a) from about 20 to about 30 parts by weight of gum base;
 (b) from about 5 to about 10 parts by weight of gum acacia-in-water, said gum acacia-in-water system containing from about 30% to about 60% by weight gum acacia powder;
 (c) from about 30 to about 40 parts by weight of sorbitol;
 (d) from about 2 to about 4 parts by weight gum acacia powder;
 (e) from about 20 to about 30 parts by weight mannitol; and
 (f) about 0.5 to about 2.5 parts by weight of flavoring and artificial sweeteners.

3. The sugarless chewing gum composition of claim 2 wherein said gum acacia-in-water system contains from about 45% to about 50% by weight gum acacia powder.

4. A sugarless chewing gum composition consisting essentially of an intimate admixture of the following:

| Ingredients: | Parts by weight |
| --- | --- |
| Gum base | 20–30 |
| Gum acacia solution (45%–50%) | 5–10 |
| Gum acacia powder | 2–4 |
| Mannitol | 20–30 |
| Sorbitol | 30–40 |
| Flavoring and saccharin | 0.5–1.5 |

5. A sugarless chewing gum composition consisting essentially of an intimate admixture of the following:

| Ingredients: | Parts by weight |
| --- | --- |
| Gum base | 28 |
| Gum acacia solution (45%–50%) | 6 |
| Gum acacia powder | 3 |
| Mannitol | 27 |
| Sorbitol | 36 |
| Flavoring and artificial sweeteners | 1 |

6. A method for the preparation of a sugarless chewing gum having improved taste and texture characteristics which comprises the steps of
  (a) blending at a temperature maintained below 70° C. from about 3 to about 15 parts by weight of gum acacia-in-water wherein the gum acacia is present in an amount from about 30% to about 60% by weight, about 20 to about 50 parts by weight of gum base, and artificial sweeteners to a substantially uniform blend;
  (b) thereafter adding from about 20 to about 50 parts by weight sorbitol and mixing the sorbitol with said blend;
  (c) adding from about 0 to about 10 parts by weight gum acacia powder and from about 20 to about 50 parts by weight mannitol;
  (d) blending the combined ingredients at a temperature of about 35° C. to about 50° C. to a substantially uniform mixture; and
  (e) adding flavoring and blending to form said sugarless chewing gum.

7. The method of claim 6 wherein the gum base is added in an amount from about 20 to about 30 parts by weight, gum acacia-in-water is added from about 5 to about 10 parts by weight, sorbitol is added in an amount from about 30 to about 40 parts by weight, gum acacia powder is added in an amount from about 2 to about 4 parts by weight, mannitol is added in an amount from about 20 to about 30 parts by weight and flavoring and artificial sweeteners are added in an amount from about 0.5 to about 2.5 parts by weight.

8. The method of claim 6 wherein the acacia-in-water system contains from about 45 to about 50% by weight gum acacia powder.

References Cited

UNITED STATES PATENTS

| 2,876,105 | 3/1959 | Jucaitis et al. | 99—141 |
| 2,876,106 | 3/1959 | Jucaitis et al. | 99—141 X |
| 2,997,493 | 8/1961 | Huber | 99—135 X |

OTHER REFERENCES

Whistler et al. Industrial Gums, New York Academic Press, 1959, pages 271 and 274.

A. LOUIS MONACELL, *Primary Examiner.*

RAYMOND N. JONES, *Examiner.*

S. E. HEYMAN, *Assistant Examiner.*